(12) United States Patent
Sisk

(10) Patent No.: US 8,727,306 B2
(45) Date of Patent: May 20, 2014

(54) VALVE HANDLE FOR BUTTERFLY VALVE FOR BULK COMMODITY HOPPER WITH TEE

(75) Inventor: David E. Sisk, Bonne Terre, MO (US)

(73) Assignee: Bulk Tank, Inc., Porkville, MO (US)

( * ) Notice: Subject to any disclaimer, the term of this patent is extended or adjusted under 35 U.S.C. 154(b) by 0 days.

(21) Appl. No.: 13/506,244

(22) Filed: Apr. 6, 2012

(65) Prior Publication Data

US 2012/0261602 A1 Oct. 18, 2012

Related U.S. Application Data

(60) Provisional application No. 61/517,041, filed on Apr. 12, 2011.

(51) Int. Cl.
*F16K 31/60* (2006.01)

(52) U.S. Cl.
USPC .......................................... 251/101; 137/270

(58) Field of Classification Search
CPC .................................. F16K 35/00; F16K 35/06
USPC ......... 251/95, 98, 99, 101, 104, 106; 137/270
See application file for complete search history.

(56) References Cited

U.S. PATENT DOCUMENTS

| | | | | | |
|---|---|---|---|---|---|
| 1,562,121 | A | * | 11/1925 | Newton | 73/863.73 |
| 3,311,128 | A | * | 3/1967 | Taylor | 137/383 |
| 4,176,675 | A | * | 12/1979 | Liberman | 137/340 |
| 4,193,320 | A | * | 3/1980 | Oota | 74/535 |
| 4,304,256 | A | * | 12/1981 | Taiani | 137/556.3 |
| 4,747,427 | A | * | 5/1988 | Smith et al. | 137/270 |
| 4,848,396 | A | | 7/1989 | Sisk | |
| 5,842,681 | A | | 12/1998 | Sisk | |
| 6,607,177 | B2 | | 8/2003 | Burian et al. | |
| 6,616,123 | B2 | | 9/2003 | Burian et al. | |
| 6,786,362 | B2 | | 9/2004 | Sisk | |
| 2007/0209216 | A1 | * | 9/2007 | Accumanno | 30/279.2 |

\* cited by examiner

*Primary Examiner* — John K Fristoe, Jr.
*Assistant Examiner* — Daphne M Barry
(74) *Attorney, Agent, or Firm* — Paul M. Denk

(57) ABSTRACT

A valve handle for a bulk commodity hopper valve, the handle including an extended handle bar member, with a valve stem socket opening near its distal end, an associated, shorter lock lever member positioned to extend generally adjacent the handle bar member, the handle bar and lock lever members having corresponding offset bends along their lengths to clear interfering equipment and being pivotally connected to one another at an intermediate position along their lengths, and a biasing spring normally biasing the proximate ends of the handle bar and lock lever members away from one another and the distal ends thereof towards one another, with the distal end of the lock lever member having a lever tip associated therewith movable into and out of engagement with the valve lock notches as the proximate ends of the handle bar member and lock lever member are squeezed together and released by a user and the valve handle is rotated to operate the valve.

20 Claims, 9 Drawing Sheets

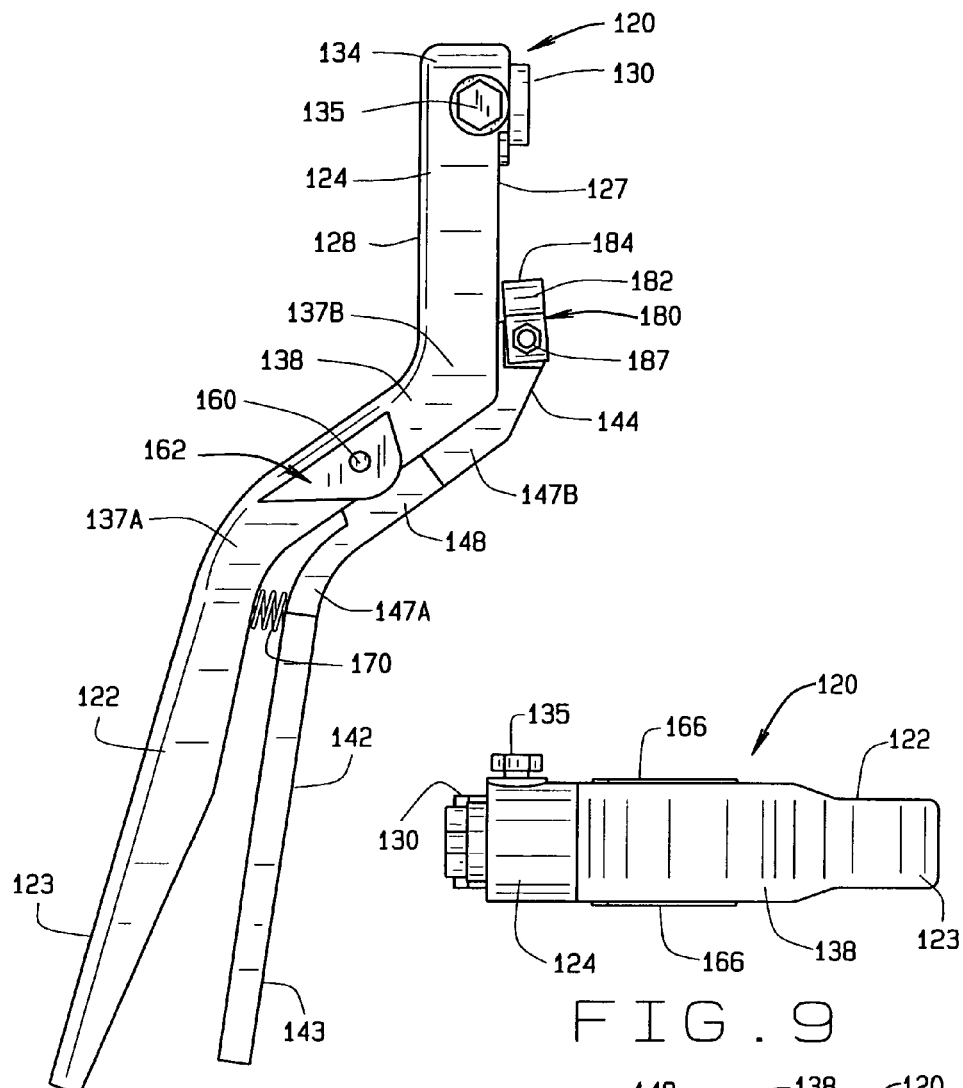
FIG. 8
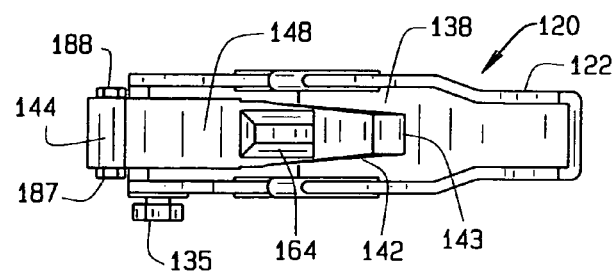
FIG. 9
FIG. 10

VALVE HANDLE FOR BUTTERFLY VALVE FOR BULK COMMODITY HOPPER WITH TEE

CROSS REFERENCE TO RELATED APPLICATIONS

This utility application claims priority to the provisional application having Ser. No. 61/517,041, filed Apr. 12, 2011, which claims priority to pending design application having Ser. No. 29/372,802, filed Jan. 13, 2011, commonly owned by the same inventor.

FIELD OF THE INVENTION

This invention is directed to a valve handle for operating a butterfly valve of the type associated with hopper tees at the bottoms of bulk commodity hoppers for use in unloading the contents of the bulk commodity hoppers.

BACKGROUND OF THE INVENTION

Hoppers and tank trailers have been commonly employed for many years to transport bulk commodities such as industrial and food products, including industrial products such as pelletized plastics and the like, and food products such as milled flours and the like. The hoppers often include multiple sections or compartments for receiving and holding the products, with each section or compartment having a generally conical or tapered bottom portion terminating at a discharge outlet. Discharge or dump valves are typically associated with the discharge outlets and inverted hopper tee assemblies are generally located below the valve positions.

When such a hopper or tank trailer reaches its destination, the bulk commodity must be unloaded therefrom. Typically, this is affected by connecting the tee assemblies for unloading and then effecting the pneumatic unloading of the bulk commodity from the hopper into a clean and sanitary pipe line. In such regard, the tee assemblies are connected at opposite ends thereof to generally horizontal pipes or hoses that are connected, in turn, to the hopper tees of other sections or compartments. Such connections establish a generally horizontal path through the hopper tees and connected pipes or hoses for the flow of the materials discharged from the hopper sections or compartments.

Actual transfer of the bulk commodity that has been transported in the hopper is then accomplished by opening the discharge or dump valve, typically a butterfly valve, associated with the discharge outlet at the bottom of the hopper, thereby allowing the bulk commodity material to be moved out of such hopper by gravity flow or by air pressure vibration into and through the vertical section of the hopper tee. As the bulk commodity material drains through the vertical section of the hopper tee into the horizontal portion of the hopper tee, such material is directionally directed through such horizontal portion by a pressure differential in the pipe, typically occasioned by a blower or the like disposed at one end of the flow path, to cause such material to be directed to and discharged to a desired receptacle or area.

The hopper tee assemblies may be of welded or cast iron or like construction, or may be of a newer swing-away design. Exemplary hopper tee assemblies of various types are described in various prior art patents, including U.S. Pat. No. 4,848,396, U.S. Pat. No. 5,842,681, U.S. Pat. No. 6,607,177, U.S. Pat. No. 6,616,123, and U.S. Pat. No. 6,786,362, among others.

The discharge or dump valves, which, as already mentioned, are typically of a butterfly type design, are generally configured to be manually operable and to have associated therewith a rotatable valve stem that projects generally sidewardly outwardly and generally horizontally near the top of the vertical section of the hopper tee to be complementarily engaged by a valve handle so as to be rotated by the operation of such valve handle to open and close the valve. Typically, the projecting portion of the valve stem has been formed or machined at its outer end to have a non-circular cross-section so as to be easily engageable by a complementarily configured socket portion associated with the valve handle.

Often, the valve construction also includes a valve lock disc or plate, generally of a roughly circular configuration, mounted to be generally perpendicular to the projecting valve stem and to extend radially outward from such valve stem, with a plurality of spaced notches, and intervening teeth therebetween, formed along a portion of the outer periphery thereof to form valve lock positions for the valve when such notches, sometimes hereinafter referred to variously as valve lock position notches or valve lock notches, are suitably engaged by a complementary lever tip of the valve handle.

Prior art valve handles have included constructions comprising a longitudinal, generally substantially straight, handle bar or like body member, often with a grip portion near its proximate end, and with a socket configuration at its distal end adapted to relatively snugly engage the projecting valve stem to allow the handle and the engaged valve stem to be manually rotatable by the handle user to open and close the valve. Some valve handles have also included a shorter, also generally straight, lock lever member, sometimes hereinafter referred to more simply as a lock lever, extending generally adjacent to the handle bar, from near the proximate end of the handle bar to a position short of the distal end thereof, and pivotally connected to such handle bar at an intermediate location between the proximate and distal ends thereof to ordinarily bias the proximate end of the lock lever away from the proximate end of the handle body member and the distal end of the lock lever towards the distal end of the handle bar. In such constructions, the lock lever has generally included a lever tip near the distal end of such lock lever sized to engage the lock position notches on the valve lock plate so as to be able to lock the valve handle and the engaged valve in a desired condition.

For constructions that include such a lock lever, the requisite biasing is typically effected by a biasing spring connected between the longitudinal member and the lock lever at a position along the lengths of such members between a pivot connection and the proximate ends thereof. With such a valve handle, when a user grips and squeezes the proximate ends of the longitudinal member and the lock lever towards one another, the biasing spring is compressed and the lock lever pivots about the pivot connection to move the lever tip at the distal end of the lock lever away from the handle bar member, and out of engagement with the valve lock position notches on the valve lock plate, thus allowing a user to rotate the valve handle and the engaged valve stem to another position. When the user thereafter releases the proximate, or grip, end of the lock lever, the biasing spring will again bias the proximate end of the lock lever away from the proximate end of the longitudinal member thereby causing the lever tip at the distal end of the lock lever to move back towards the handle bar member and into engagement with a different lock position notch on the valve lock plate. In such manner, a user can control the degree by which the valve is maintained opened, without the necessity of manually holding the valve handle in position.

Because the discharge valves for the hoppers are positioned at the bottoms of the hoppers, access thereto for purposes of opening and closing such valves is often inconvenient, in part because of the limited ground clearance height of the valves and their positions generally approximately centered below the hoppers, as a consequence of which the valve handles must frequently be employed by users while such users are in awkward or less than desirable positions and conditions. Consequently, over the years, it has become desirable, if not customary, for valve handles to be constructed from aluminum or other lighter weight materials so as to lessen the strain on users as they attempt to handle and utilize such valve handles in awkward positions.

Unfortunately, despite the desirable qualities of such lighter weight materials and the desirable effects realized by the use thereof in valve handles, valve handles constructed of such lighter weight materials suffer from certain disadvantages, including wear characteristics that are worse than for heavier weight materials. Because of the increased wear characteristics associated with and experienced by such lighter weight materials, valve handles constructed of such lighter weight materials, and particularly the lever tips thereof that engage with the lock lever positions to lock the valve handles and engaged valves in desired conditions, suffer from greater and more rapid wear, which, over time, limits the efficacy of such lighter weight handles and requires more frequent replacement thereof.

Moreover, especially with the increased use of swing-away hopper tees, and because of their designs and the various external components thereof that extend sidewardly and outwardly below the valve stem, it has become increasingly common for users of valves handles to encounter additional space and operating restrictions when they attempt to use the valve handles to operate the valves.

Consequently, there has existed a desire and need for an improved valve handle that can be more easily operably employed by a user without encountering undue interference with other equipment at the bottoms of the hoppers and which can also be relatively lightweight while being more resistant, especially with respect to the lever tip, to undesirable wear.

SUMMARY OF THE INVENTION

The present invention is such an improved valve handle that is so designed, configured, and constructed as to alleviate many of the interference problems that have previously been encountered with swing-away tee assemblies and which also includes a lever tip portion, as part of a relatively light weight valve handle, which exhibits better wear characteristics.

Typically, when a valve handle is positioned to be used for operating the discharge valve of a hopper, the face of an element nearer to the hopper is considered to be the inner or inside face of the element and to also be positioned interiorly to an element located further from the hopper. Moreover, since valve stems are frequently considered to project outwardly from the hopper towards the left, the inner or inside face of an element may typically be considered to be disposed to the right of the outer or outside face of such element and also to the right, and interior, of an element located further to the left from the hopper. Consequently, for purposes of further description and discussion, references to the inner, outer, front, and back sides of various elements should be considered to be references to those elements as they are so disposed relative to the hopper valve and in position to be used.

From such a viewpoint, the improved valve handle of the present invention thus includes an extended handle bar member, hereinafter often and generally referred to more simply as a handle bar, and an associated, generally shorter, lock lever member positioned to extend generally adjacent to the inner side of the handle bar, with such lock lever member being pivotally connected to the handle bar at an intermediate position along the lengths of the handle bar and the lock lever member and having a lever tip associated with its distal end. The proximate end portions of the handle bar and the lock lever members generally extend to be near to, but spaced slightly from, one another, and are configured so as to be conveniently grippable by a hand of a user. The distal end portion of the handle bar extends beyond the distal end portion of the lever member and includes a socket opening extending thereinto from the interior, or valve stem, side thereof and above the distal end portion of the lever member, with the socket sized to be complementarily engageable with the valve stem when the valve handle is moved into engagement therewith.

Optionally, the handle bar may include an adjustment mechanism that interacts with the socket opening to ensure a snug fit of the valve stem within the socket. In one embodiment, such an adjustment mechanism may take the form of a threaded opening that extends into the handle bar from the top, front, or back side thereof and intersects with the socket opening, and an associated bolt or like member that may be adjustably threadably screwed into the threaded opening by a sufficient amount to project into the intersected socket opening to ensure a snug fit of the valve stem within the socket opening. Also, optionally, a ratcheting mechanism, including a ratcheting reversal feature, could be associated with, or include as a part of, the requisite socket opening.

The lock lever member is pivotally attached near a midpoint thereof to the handle bar member at a midpoint along the handle bar member, with the thus attached handle bar and lock lever members forming a handle assembly construction. The handle bar and lock lever members of the formed handle assembly construction are both further configured to include along their lengths corresponding, generally adjoining, offset bends such that, overall, the handle assembly construction has a generally stepped staircase configuration, or generalized tilde configuration, that is, a configuration that resembles a stairway with an intermediate step, or tread, disposed between lower and upper riser portions. Generally, the proximate end portions of the handle bar and lock lever members may be considered to form the lower riser portions of such members, with the distal end portions of such members forming upper riser portions, and with the intermediate portions between the offset bends forming the intermediate step or tread portions of such members. The depth of the formed step or tread portion of such stepped staircase configuration is preferably selected to be sufficient to space the lower riser portion, that is, the proximate end portion of the handle assembly construction, beyond the outermost projection of the hopper tee assemblies, including beyond the extent of swing-away hopper tee assemblies when they have been dropped, and the height of the upper riser portion is preferably selected to also maintain the step or tread portion above and/or clear of any interference with the hopper tee assemblies.

As will be further addressed and explained hereinafter, in some embodiments the distal end of the lock lever member may be so positioned to be adjacent a location along the upper riser portion of the handle bar member, with a lever tip projecting further generally adjacent to and along the upper riser portion of the handle bar member, but, in other embodiments, the distal end of the lock lever member may terminate at or near the point of the upper offset bend of the handle assembly construction such that the projecting lever tip associated with the lock lever member extends angularly from the distal end of the lock lever member to and along the upper riser portion of the handle bar and forms essentially the entirety of the riser portion of the lock lever member.

Due to such stepped staircase configuration of the valve handle, a user can readily employ the valve handle of the present invention without encountering interference with the swing-away hopper tee assemblies that are now frequently utilized with hoppers. When the valve handle is positioned to engage the valve stem of the discharge valve, with the lock lever member lying to the inside of the handle bar, that is, closer to the valve stem than the handle bar, and with the distal end portions of the handle bar and the lock lever members positioned to be generally vertically above the proximate end portions thereof, the proximate end portions of such handle bar and lock lever members may be seen to be horizontally offset from, to the left of and below, such distal ends. As the user operates the valve handle to operate the valve, the offset, proximate end portion of the valve handle may be rotated clear of any projecting equipment associated with the hopper tee assembly.

Preferably, the pivotal connection between the handle bar and the lever member is along the reach of the offset, and a biasing spring or other biasing device is employed between the pivotal connection and the proximate ends of the handle bar and the lever member to bias the proximate ends of such handle bar and lever member away from one another and to thereby bias the distal ends thereof towards one another.

The distal end of the lever member has a lever tip associated therewith that is so configured and sized as to be engageable in the lock lever notches of the valve lock plate to lock the valve in a desired condition when the valve handle has been engaged with the valve stem and operated, with the distance between the socket opening on the handle bar and the outermost end of the lever tip determined by the size of the valve lock plate and the positioning of the valve lock position notches about the periphery thereof. The distal end of the lever member preferably includes a lever tip mounting assembly thereat for mounting a replaceable lever tip, preferably of a hardened or wear resistant material.

In one preferred embodiment the lever tip may be of a clip design mounted to the distal end of the lever member. Such a clip may have a generally inverted U-shape with a further inverted V-shaped projection formed in and projecting upwardly from near the center of the base portion of the U-shape. The legs of the generally U-shaped clip may be bolted or otherwise conveniently attached to the distal end portion of the lever member such that, when the valve handle is engaged with the valve stem, the inverted V-shaped portion of the clip engages the valve lock notches in the valve lock plate.

In another embodiment, the lever tip may be of a flexible extending tongue configuration formed or constructed from a hardened material so that, when a valve that is difficult to operate is encountered, the handle may be conveniently struck with a hammer or mallet or stomped on by the boot of a user to attempt to break the valve free, and the flexible lever tip can, without being worn away, flex out of the way and index over the teeth between valve lock position notches on the valve lock plate with each blow to the handle and then snap back into engagement in a valve lock position notch. Such a flexible extending tongue may include a base portion that is bolted or otherwise attached to the distal end portion of the lever member and a projecting tip portion that extends beyond such distal end to engage the valve lock notches of the valve lock plate.

The handle bar and lever member are so dimensioned, the pivotal connection is so positioned, and the spring or other biasing member is so sized and configured that, when a user grips and squeezes the proximate ends of the handle bar and lever member together, such action is sufficient to overcome the bias of the spring or other biasing member and to move the proximate ends of the handle bar and lever member towards one another, as a consequence of which, due to the pivotal connection between the handle bar and the lever member, the distal end of the lever member and the lever tip thereon will be moved away from the handle bar, inwardly towards the hopper and its discharge valve, so as to move the lever tip out of engagement with the valve lock position notches of the valve lock plate and to permit the valve handle to be rotated to rotate the engaged valve stem and to operate the valve.

When the valve handle has been rotated to a desired position and a desired opening condition of the valve has been achieved, the user may release his grip upon the lock lever member, thereby allowing the spring or other biasing member to bias the proximate ends of the lock lever member and handle bar away from one another, thus again biasing the distal ends of the lock lever member and handle bar towards one another and positioning the lever tip into a valve lock notch of the valve lock plate to lock the valve in the desired condition.

BRIEF DESCRIPTION OF THE DRAWINGS

In referring to the drawings:

FIG. 8 is a plan view of the frontside of the valve handle of FIG. 4;

FIG. 9 is a plan view along line 9-9 of FIG. 7;

FIG. 10 is a plan view along line 10-10 of FIG. 7;

DESCRIPTION OF THE PREFERRED EMBODIMENT

Figure 1:
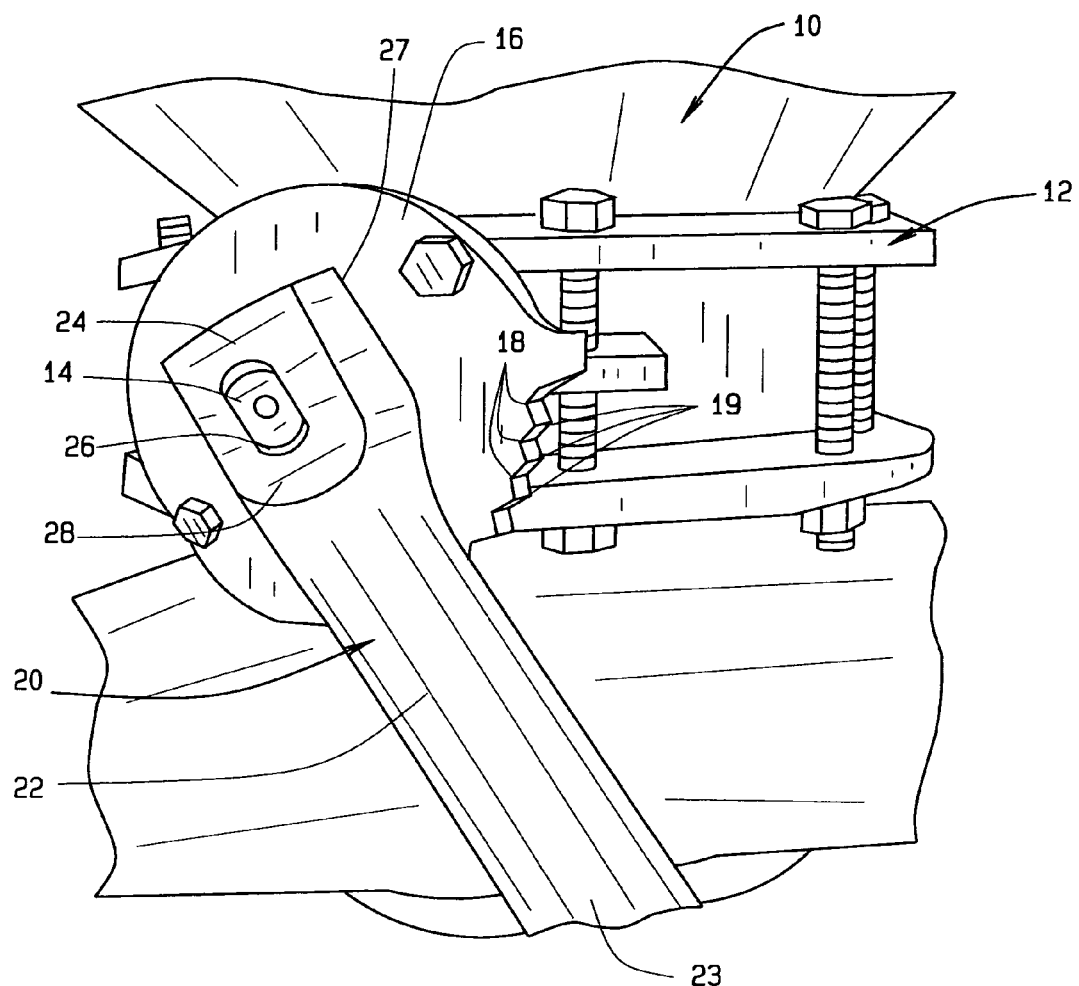
FIG. 1 is perspective view of a lower portion of a hopper showing a generally straight prior art valve handle in engagement with the valve stem of a discharge valve and also showing a typical valve lock plate.
Figure 2:
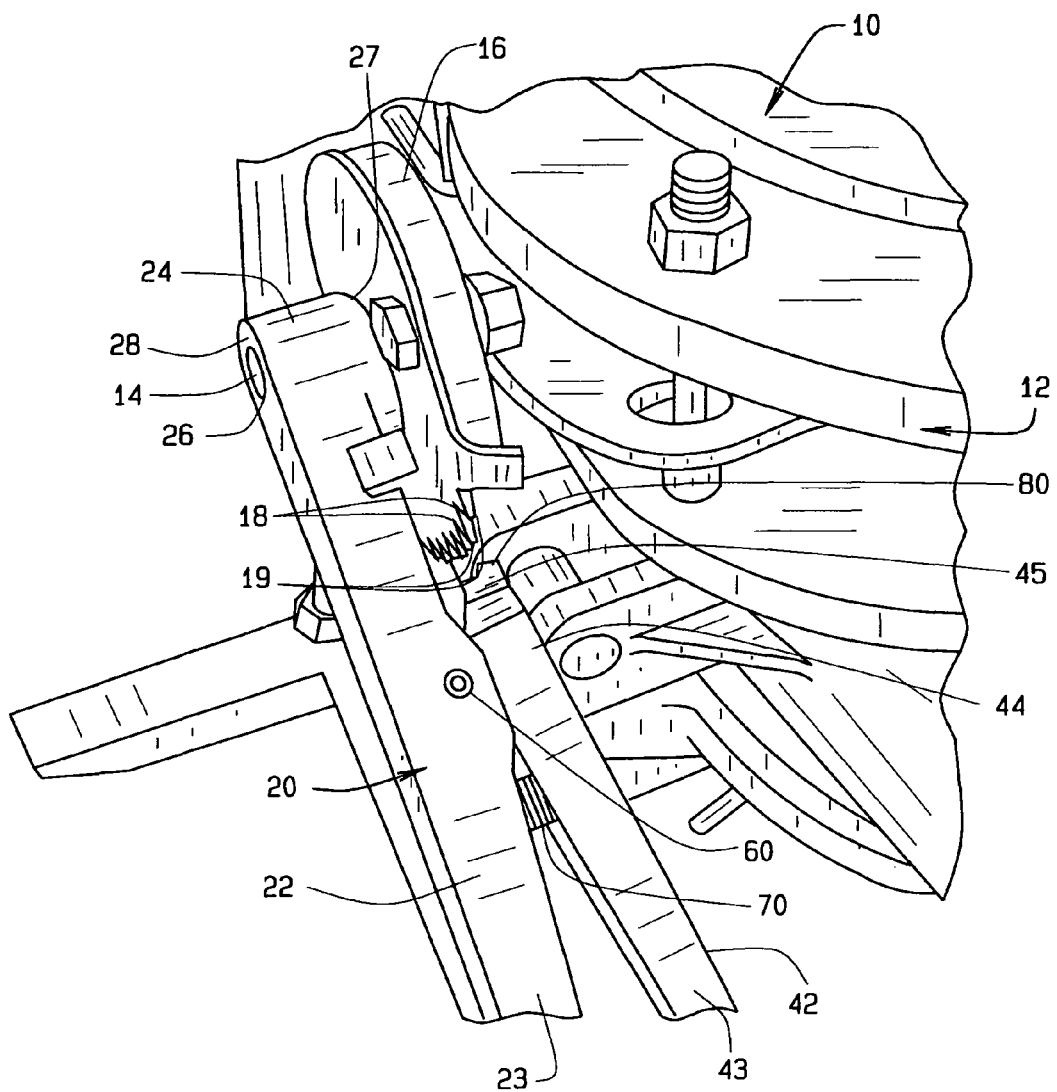
FIG. 2 is a perspective view from a different angle of the lower portion of a hopper showing the manner in which the lever tip of a prior art valve handle is moved into engagement with the valve lock position notches of the valve lock plate and showing typical wear experienced by such a lever tip.
Figure 3:
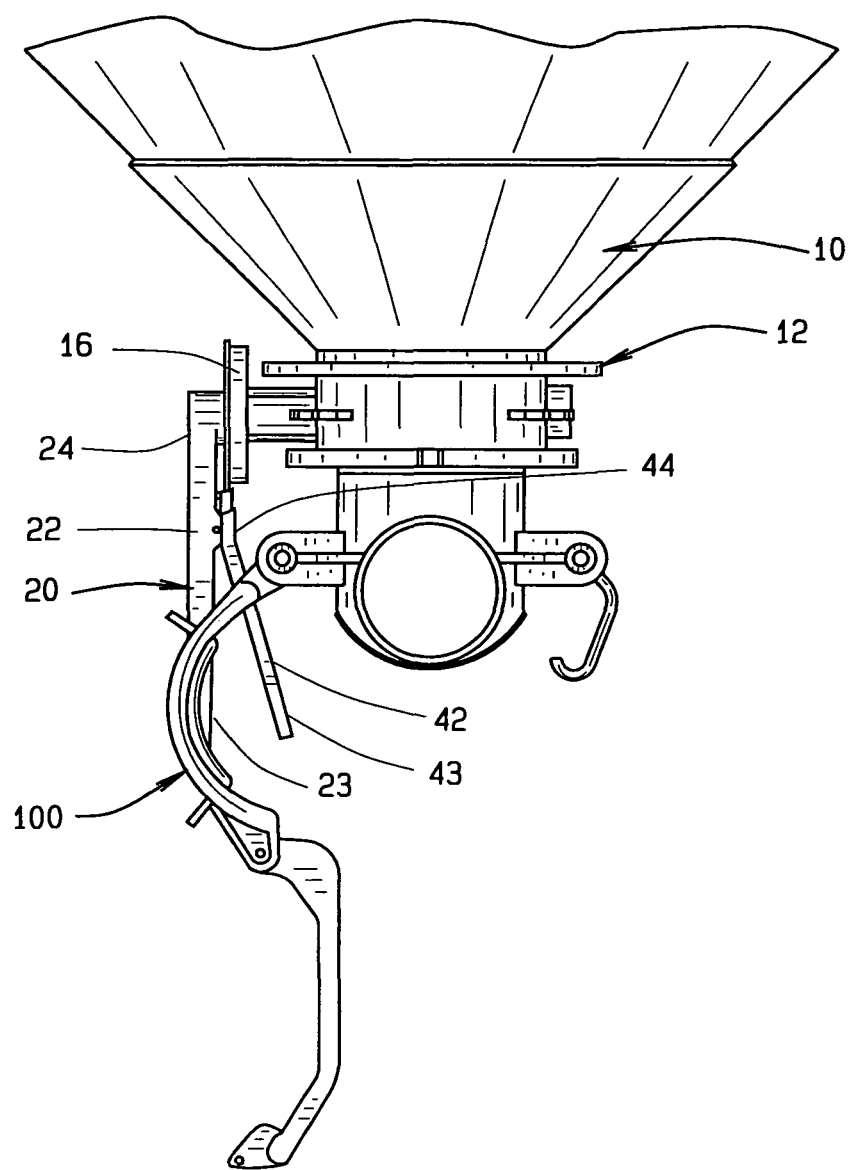
FIG. 3 is a plan view of a prior art valve handle with a hopper that has a swing-away hopper tee construction and showing the interference encountered by the valve handle and the swing-away construction.
Figure 4:
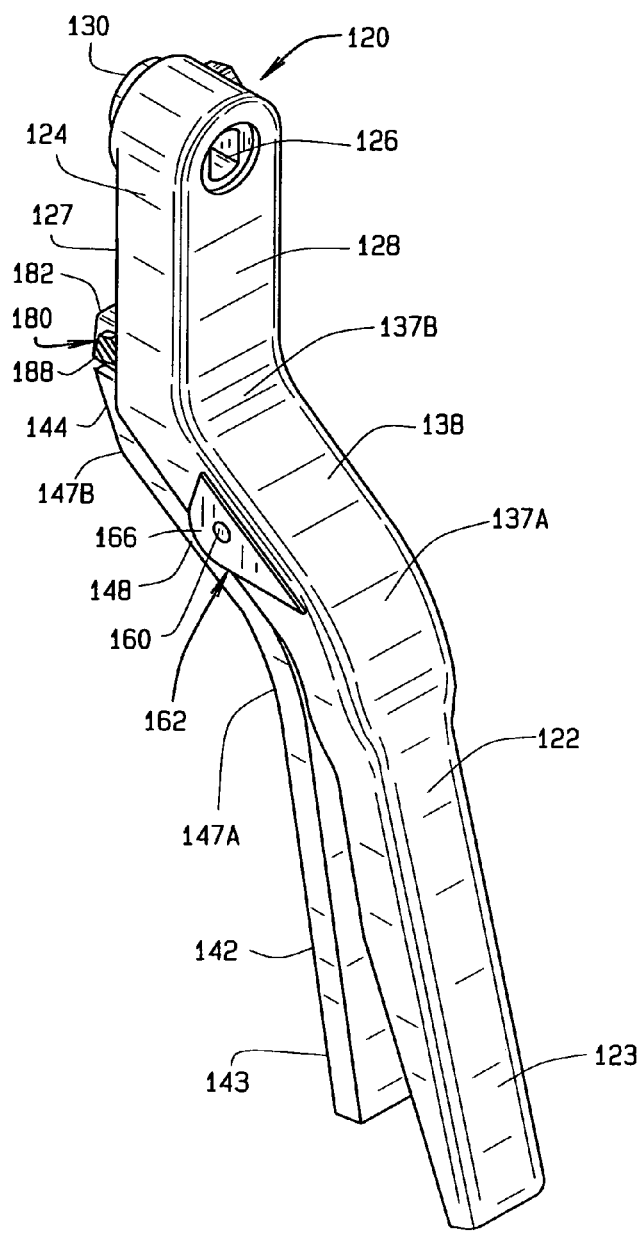
FIG. 4 is a perspective view of a preferred embodiment of a valve handle according to the present invention.
Figure 5:
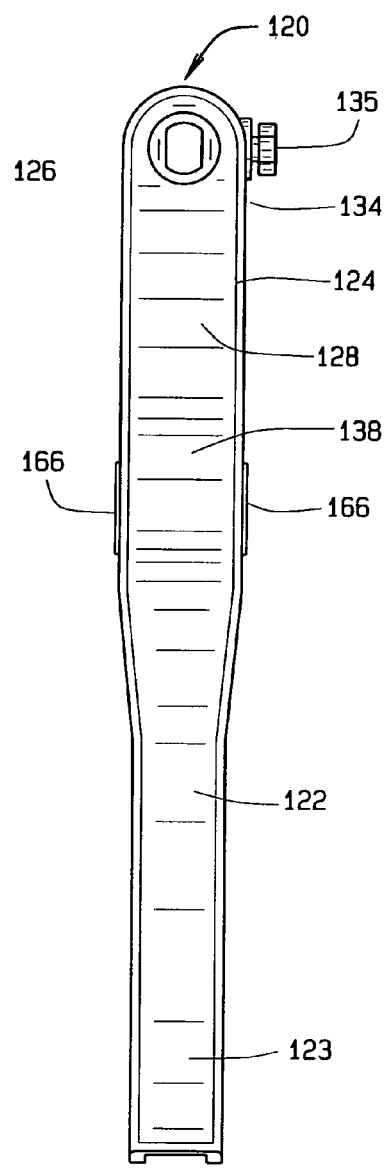
FIG. 5 is a plan view of the outside of the valve handle of FIG. 4.
Figures 6, 7:
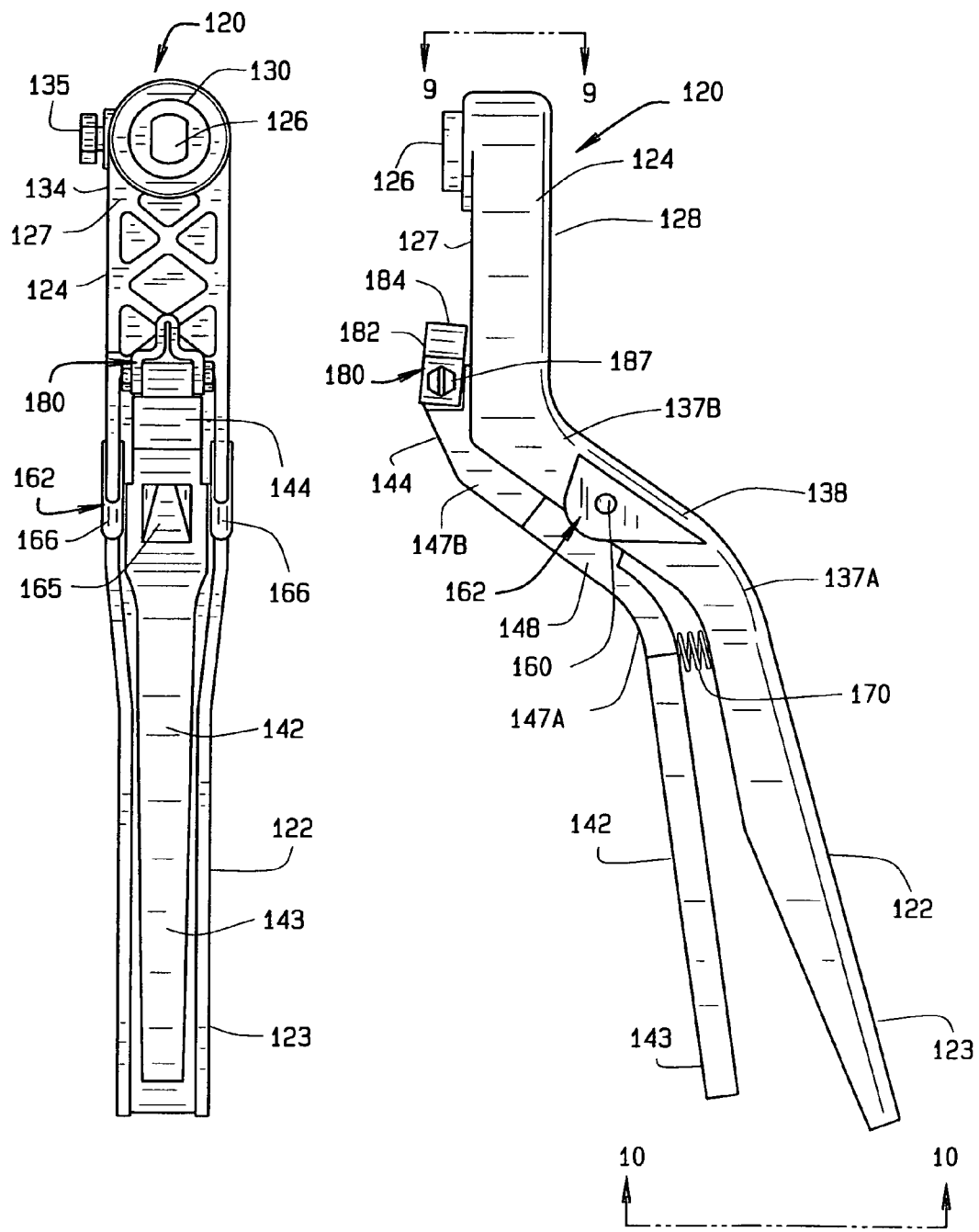
FIG. 6 is a plan view of the inside, or valve side, of the valve handle of FIG. 4.
FIG. 7 is a plan view of the backside of the valve handle of FIG. 4.

Referring now to the drawings, wherein like numbers generally refer to like items, FIGS. 1-3 all depict a bulk commodity hopper 10 having a discharge valve construction mounted near the base of the hopper 10 for controlling the discharge of material therefrom. The discharge valve construction 12 includes therewith a valve stem 14 projecting outwardly sidewardly and generally horizontally from near the base of the hopper 10 and lock lever plates 16 disposed generally perpendicular to valve stem 14 and interiorly to the outer end of valve stem 14. A plurality of lock lever position notches 18, with intervening teeth 19 therebetween, is shown formed along a portion of the outer periphery of lock lever plate 16.

All of such FIGS. 1-3 also depict a prior art valve handle 20 that includes a handle bar 22 having a proximate end portion 23 and a distal end portion 24 with a socket opening 26 extending therethrough from the inner side 27 to the outer side 28 of the handle bar 22. The socket opening 26, as best shown in FIG. 1, is configured to generally snugly engage the projecting valve stem 14.

As better shown in FIGS. 2-3, such valve handle 20, formed or constructed from aluminum, also includes a lock lever member 42 having a proximate end portion 43 and a distal end portion 44, with a distal end 45, that is disposed extending generally along the inner side 27 of handle bar 22 and is pivotally attached to handle bar 22 at a pivot connection point 60 therealong such that the proximate ends 23 and 43 of handle bar 22 and lock lever member 42 are biased away from one another and distal end portions 24 and 44 of handle bar 22 and lock lever member 42 are biased towards one another by a biasing spring 70 disposed between the handle bar 22 and lock lever member 42 at an intermediate location between pivot connection point 60 and the proximate end portions 23 and 43 of handle bar 22 and lock lever member 42.

A lever tip 80 is formed at the distal end 45 of lock lever member 42 to engage a suitable lock lever notch position 18 when the valve handle 20 is employed. As best shown in FIG. 2, lever tip 80 of valve handle 20 has been worn down from use and engagement over an extended period of time with the lock lever position notches 18.

As best shown in FIG. 3, when such valve handle 20 is employed with siphon flow bottom drop or swing-away hopper tee constructions 100, interference with the operation of the valve by the valve handle 20 can often result.

Various difficulties associated such valve handle 20 and its use can be overcome by a valve handle 120 such as is depicted in FIGS. 4-11. Valve handle 120 includes a primary handle bar 122 having a proximate end portion 123 and a distal end portion 124 with an associated socket construction 130 in the distal end portion 124 extending from the inner side 127 towards the outer side 128 of the handle bar 122. Such socket construction 130 is configured to permit the projecting valve stem 14 to be snugly engaged as the valve handle 120 is used to operate the valve.

Figure 11:
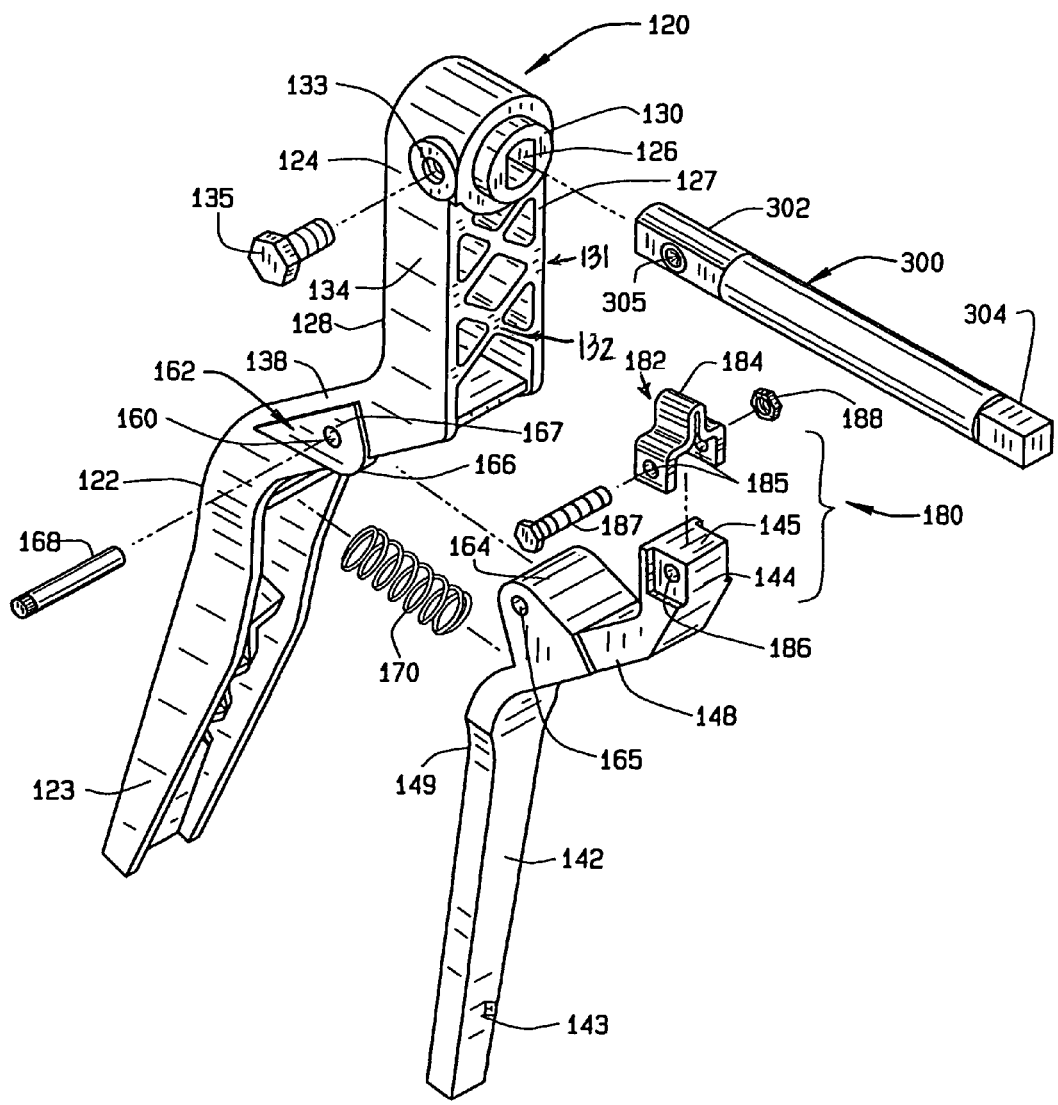
FIG. 11 is an exploded, perspective view better showing various elements of one preferred embodiment of a valve handle according to the present invention.

Preferably, to reduce weight, handle bar 122 is formed from aluminum or other lightweight material, and, as can perhaps be best seen from FIG. 11, to further reduce weight, may also be formed to have a generally U-shaped cross-sectional channel 131 along the inner side 127 thereof, with some portions of such channel including honeycomb 132 or other strengthening structures disposed therein.

Also preferably, socket construction 130 includes a socket opening 126 generally configured to engage the valve stem 14 as well a threaded slot 133 extending thereinto from the front side 134 of the handle bar 122 and a correspondingly sized adjustment bolt 135 adjustably installable in such threaded slot 133 to ensure snug engagement of the valve stem 14 within socket opening 126.

Optionally, the socket construction 130 could be configured differently than shown and could also include ratcheting or like mechanisms therewith, consistent with accepted engineering practices and constructions, including many well known constructions and configurations, provided they permit the valve stem 14 to be snugly engaged and rotated to control the valve position during use of the valve handle 120.

Such valve handle 120 also includes a shorter lock lever member 142 disposed extending generally along the inner side 127 of handle bar 122 from a proximate end portion 143 near the proximate end portion 123 of handle bar 122 to a distal end portion 144 spaced slightly below the socket construction 130 associated with the distal end portion 124 of handle bar 122 so as to avoid interference with the engagement by the socket construction 130 of the valve stem 14. As may be best seen from FIG. 8, both of handle bar 122 and lock lever member 142 include corresponding offset bends 137A and 137B and 147A and 147B along their lengths, with handle bar 122 and lock lever member 142 being connected to one another at pivotal connection point 160 by a pivotal connection construction 162 along the reaches, or step portions, 138 and 148 between the offset bends 137A and 137B and 147A and 147B. A biasing spring 170 is disposed extending between the handle bar 122 and lock lever member 142 at an intermediate location between pivot connection point 160 and the proximate end portions 123 and 143 of handle bar 122 and lock lever member 142 to maintain and permit the desired biasing between such handle bar 122 and lock lever member 142 as the valve handle 120 is employed.

The handle bar 122 and lock lever member 142 both are formed, with such offset bends 137A and 137B and 147A and 147B, to have generally stepped staircase configurations, or generalized tilde configurations, with the distal end portions 124 and 144 of such members forming upper riser portions, with the proximate end portions 123 and 143 thereof forming lower riser portions, and with the intermediate portions 138 and 148 between such the offset bends forming step or tread portions 138 and 148. The depths of the formed step or tread portions have been selected to be sufficient to space the lower riser portions, that is, the proximate end portions 123 and 143 of such handle bar 122 and lock lever member 142, beyond the outermost projection of swing-away hopper tee assemblies when they have been dropped, and the heights of the upper riser portions have been selected to also maintain the step or tread portions 138 and 148 above and/or clear of any interference with such hopper tee assemblies, as can be best observed with reference to FIG. 14.

In one preferred embodiment, as can perhaps be best seen from FIG. 11, the handle bar 122 includes a pivot nub receptor area on the inner side 127 thereof, such as within a portion of the U-shaped channel area 131, along the reach of the step 138 between the offset bends 137A and 137B of handle bar 122 to receive therein a pivot nub 164 formed on the outer side 149 of lock lever member 142, with a channel 165 extending transversely through pivot nub 164. As can be further observed from FIG. 11, pivot flanges 166 may be formed on or be part of the front and back sides of the handle bar 122 and include openings 167 configured to align with the transverse channel 165 through pivot nub 164 when pivot nub 164 is engaged within the pivot nub receptor area of handle bar 122.

Handle bar 122 and lock lever 142 are then pivotally connected to one another by a secured connection pin or other suitable joinder element 168 through openings 167 and channel 165 such that the proximate ends 123 and 143 of handle bar 122 and lock lever member 142 are normally biased away from one another and distal ends 124 and 144 of handle bar 122 and lock lever member 142 are normally biased towards one another by the biasing spring 170.

Preferably, all or the greater portions of the handle bar and lock lever members will be of aluminum or other lighter weight material in order to reduce the overall weight of the valve handle and to make it easier for a user to conveniently hold and manipulate the handle, especially in awkward or unconventional attitudes.

A lever tip construction 180 is associated with the distal end portion 144 of lock lever member 142 and configured to be engageable with the lock lever position notches 18 of the valve lock lever plate 16. In one preferred embodiment, such lever tip construction includes a clip member 182 having a generally inverted U-shape with a generally inverted V-shaped tab portion 184 projecting from the base of the inverted U-shape, with each the legs of the clip having aligned openings 185 therethrough that are registrable with a transverse opening 186 extending through the lock lever member 142 near its distal end 145. As may be best observed from FIG. 11, such distal end 145 is preferably machined or formed to permit the clip member 182, which is preferably of a symmetrical design, to fit over the distal end 145 with the openings 185 and 186 so aligned to permit a bolt 187 to be installed extending through such openings and secured in place by a nut 188, although other suitable connection members and schemes could be equally as well utilized to mount such clip member 182 or other suitable lever tip to such distal end 145. Alternatively, a lever tip could be directly formed or machined to be part of the distal end 145.

Preferably, especially if the lever tip construction 180 is of a form similar to that of FIG. 11, the clip member 182 will be of steel or other harder or hardened material so as to be more resistant to wear than the aluminum lever tips of prior art constructions and the preferred aluminum material of the handle bar 122 and lock lever member 142 of the valve handle 120. As will be appreciated, with a construction of the form shown in FIG. 11, the clip member 182, regardless of the particular material employed to form the lever tip, may be readily replaced if wear does occur, which replacement capability extends the overall life of the valve handle and results in a lower cost.

Figure 12:
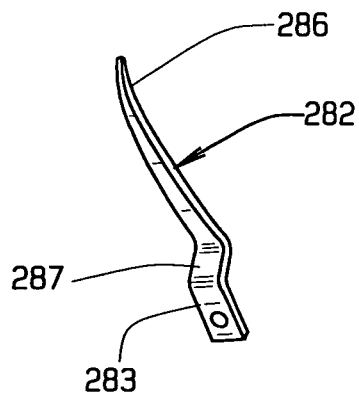
FIG. 12 is a perspective view of an alternative lever tip of a spring steel tongue configuration.

As an alternative to the lever tip construction 180 of FIG. 11, a lever tip member 282 of a spring steel tongue design, similar to the lever tip member of FIG. 12, may be mounted to the distal end 145 of lock lever member 142 to be engageable with the lock lever position notches 18. For a lock lever member 142 having a formed distal end 145 such as is depicted in FIG. 11, the spring steel lever tip 282 may preferably be of a design having a base portion 283 that is positionable along the side of the distal end 145 to generally conform thereto, with a mounting hole through such base portion 283 alignable with the transverse opening 186 through the distal end 145 of lock lever member 142. Such spring steel tip 282 is mountable to the distal end 145 of lock lever member 142 by a nut and bolt connection 285, or other suitable connection, and spring steel lever tip 282 includes a projecting tongue portion 286 with an offset bend 287 near its lower end connecting the tongue portion 286 to the base portion 283 in such a manner that the projecting tongue portion 286 is generally centered on the distal end 145 of lock lever member 142.

Such steel lever tips provide increased wear resistance, even in extremely harsh environments, and are able to withstand not only normal wear and abuse, but also abnormal wear and abuse, thereby improving the performance and longevity of the valve handles with which they are utilized. Moreover, when lever tips of such a spring steel tongue design are employed, when a difficult to open valve is encountered, the handle may be struck by a hammer of mallet, or stomped on by the boot of a handle user, to operate the valve, with lessened wear upon the tip since the steel tip may flex out of the way and index over the teeth 19 on the valve lock plate 16 with each blow and then snap back into engagement in a valve lock position notch due to the biasing of the lock lever member. Such flex action reduces not only the wear upon the lever tip, but also wear to the valve lock plate 16 and to the teeth 19 thereon formed by the lock plate position notches 18, which wear is common with use of the prior art aluminum valve handle constructions.

Figure 13:
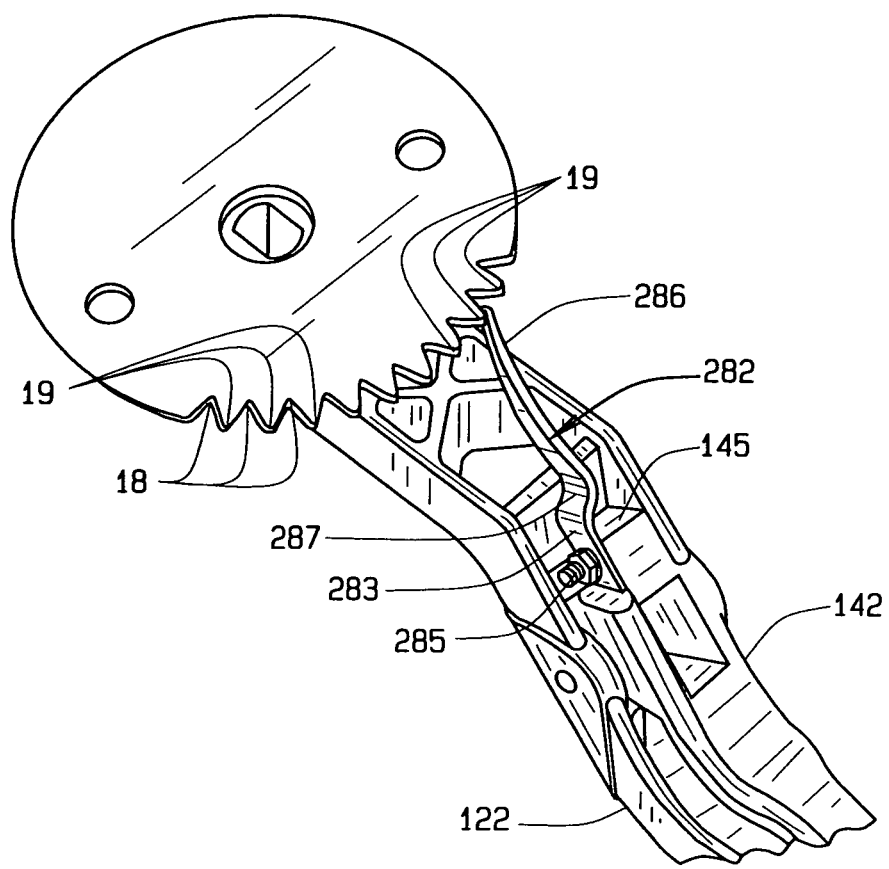
FIG. 13 is a perspective view of another valve handle according to the present invention depicting an alternative lever tip embodiment similar to that of FIG. 12 and the manner of engagement thereby with the valve lock position notches of a valve lock plate.

Although the lock lever member of the valve handle is preferably of the form as described and discussed hereinabove, wherein the distal end of the lock lever member is disposed extending generally adjacent to the handle bar above the reach of the offset portions of such lock lever member and the handle bar, the lock lever member may, particularly when the lever tip of the lock lever member is of the spring steel tongue design, terminate at a lower level, such as at or near the upper offset bend of the handle bar, as shown in FIG. 13, provided the spring steel tongue is so sized relative to the valve handle to extend generally adjacent to the upper portion of the handle bar to be engageable with the valve lock plate notches 18 of the valve lock plate 16.

Figure 14:
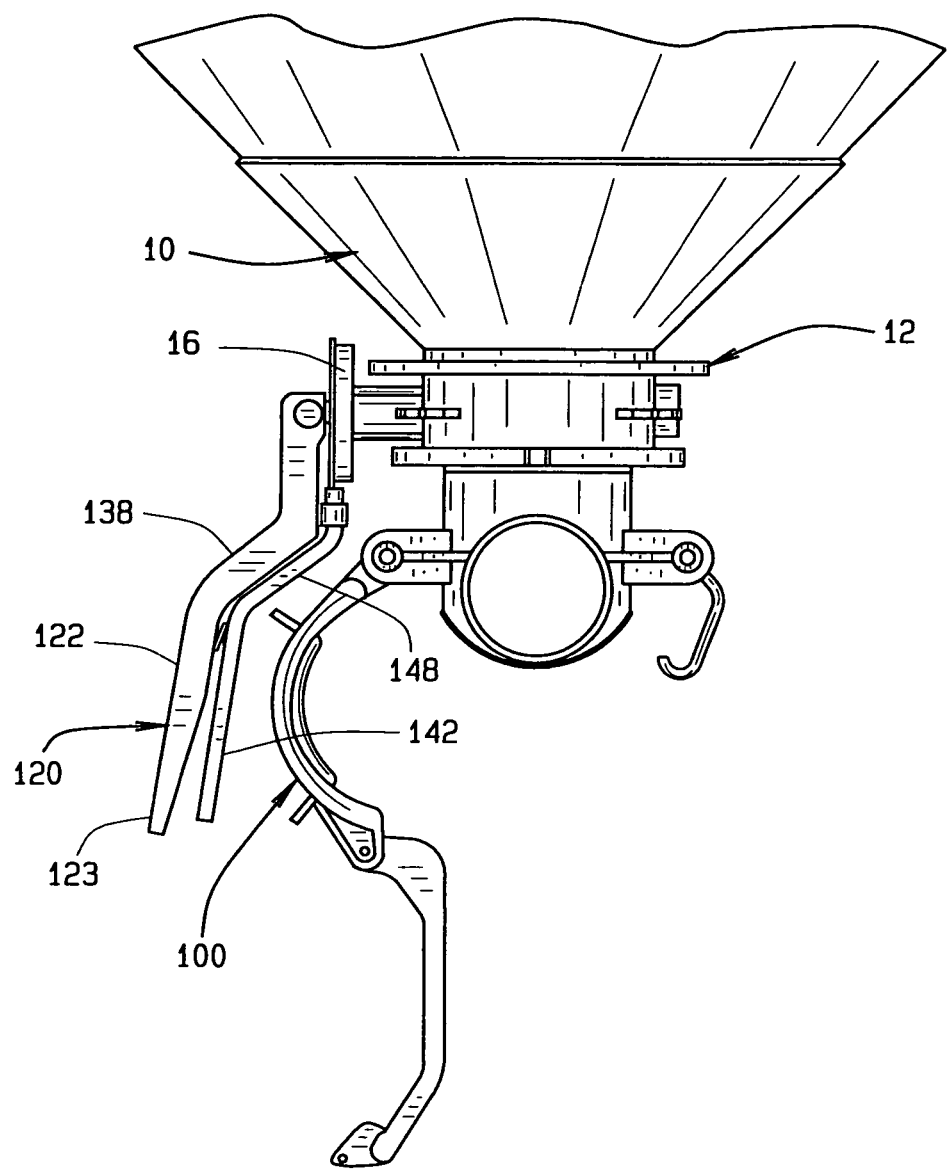
FIG. 14 is a plan view similar to FIG. 3, but showing a valve handle according to the present invention instead of a prior art valve handle and illustrating the lack of interference encountered between the valve handle according to the present invention and the swing-away hopper tee construction.

Those skilled in the art will recognize and understand that the lengths of the handle bar and lock lever member, the positions of the offset bends, and the lengths of the reaches, or step portions, of the offsets may be so selected and varied to best provide clearance from the hopper tees, including from siphon flow bottom drop tees, and related or associated equipment, while still permitting the users of such handles to suitably grip and readily apply such handles to apply suitable leverage to be able to effectively operate the hopper discharge valves, and they will also recognize and understand that many possible configurations of valve handles, consistent with the present invention are possible. In such regard, FIG. 14 illustrates how a valve handle according to the present invention, unlike prior art valve handle 20 of FIG. 3, can be readily employed with a hopper discharge valve without encountering interference in the operation thereof due to the presence of a swing-away hopper tee.

Those skilled in the art will further recognize that, while the various valve handle embodiments described and discussed hereinabove have employed spring members positioned and connected to normally bias the proximate ends of the handle bars and lock lever members of the valve handles away from one another, other biasing mechanisms, including differently positioned or connected spring members, such as spring members positioned on opposite sides of the pivot connections to normally bias distal ends of the handle bars and the lock lever members towards one another, could be equally as well employed, as also could other types of biasing mechanisms and arrangements. To the extent that all of such possible biasing mechanisms and arrangements can be employed to effect is the same or similar result as that of the spring members described and discussed hereinabove, they should thus be considered to be applicable to the present invention.

While it is generally the case that the improved handle 120 will mate with a projecting valve stem 14 associated with the discharge valve construction 12, it may sometimes be desirable for a user to employ an extender shaft 300, and similar to what is depicted in FIG. 11, to more conveniently mate the handle 120 to valve stem 14. Such an extender shaft 300 will preferably have a first end 302 configured to be complementarily engaged by the socket construction 130 and a second end 304 configured to be matable to the valve stem 14 either directly or through a mating socket assembly such as is commonly known in the art. As shown in FIG. 11, the first end 302 of the extender shaft 300 may also include a generally transverse bore 305 extending thereinto sized to be engaged by, or to snugly receive, a portion of the adjustment bolt 135 projecting through threaded slot 133.

In light of all the foregoing, it should thus be apparent to those skilled in the art that there has been shown and described a valve handle for operating a butterfly valve of the type associated with hopper tees at the bottoms of bulk commodity hoppers for use in unloading the contents of the bulk commodity hoppers. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A valve handle for operating a valve having a projecting valve stem and a valve lock plate that extends transversely to such valve stem and includes one or more valve lock position notches along a portion of the outer periphery thereof, wherein the valve is installed in a construction that has associated therewith obstructions that extend parallel to the valve stem, the valve handle comprising:

a longitudinal handle bar member having proximate and distal ends and end portions and an inner side, and including a socket opening extending into said distal end portion from said inner side thereof, said socket opening sized to be complementarily engageable with the valve stem of the valve;

a longitudinal lock lever member extending adjacent to said handle bar member along said inner side thereof from near said proximate end of said handle bar member to a distance spaced below said socket opening in said distal end portion of said handle bar member, said lock lever member having proximate and distal ends and end portions, the distal end portion having an opening extending through the lock lever member;

said handle bar member pivotally connected to said lock lever member at midpoints along the lengths of said handle bar and lock lever members;

a biasing mechanism disposed along the lengths of said handle bar and lock lever members to normally bias said proximate end portion of said handle bar member away from said proximate end portion of said lock lever member and said distal end portion of said handle bar member towards said distal end portion of said lock lever member;

said handle bar and lock lever members having intermediate corresponding offset bends formed therein along the lengths of said handle bar and lock lever members to define corresponding intermediate steps in said handle bar and lock lever members, with said distal end portions of said handle bar and lock lever members forming upper risers for said steps and said proximate end portions of said handle bar and lock lever members forming lower risers for said steps;

said distal end portion of said lock lever member including an associated lever tip extending to below said socket opening in said handle bar member to be complementarily engageable with at least one of said valve lock position notches when said handle bar is in a desired position with said socket opening in said handle bar engaged with the valve stem, the lever tip having a pair of openings for alignment with the opening in the distal end of the lock lever member and the pair of openings and the opening in the distal end of the lock lever member for receiving a bolt for connecting the lever tip to the lock lever member;

said proximate end portions of said handle bar and lock lever members configured and adapted to be grippable by a user and squeezable to overcome the biasing of said biasing mechanism to move said proximate end portion of said handle bar member towards said proximate end portion of said lock lever member and said distal end portion of said handle bar member away from said distal end portion of said lock lever member, said movement of said distal end portion of said handle bar member away from said distal end portion of said lock lever member being sufficient to move said lever tip associated with said lock lever member away from engagement with said valve lock position notches of the valve lock plate and permitting rotation of said handle bar member and the valve stem engaged by said socket opening of said handle bar member to a desired position to operate the valve;

said proximate end portions of said handle bar and lock lever members being releasable by the user when said handle bar member and the valve stem engaged by said socket opening of said handle bar have been rotated to a desired position to operate the valve and said biasing mechanism operating upon such release to bias said proximate end portion of said handle bar member away from said proximate end portion of said lock lever member and said distal end portion of said handle bar member towards said distal end portion of said lock lever member to effect engagement of said lever tip associated with said lock lever member with a valve lock position notch;

said offset bends sized and positioned along said handle bar and lock lever members to permit said valve handle to clear the obstructions associated with the construction in which the valve is installed when the valve handle is rotated to operate the valve.

2. The valve handle of claim 1 wherein said biasing mechanism includes a biasing spring.

3. The valve handle of claim 2 wherein said biasing spring is installed extending between said proximate ends of said handle bar and lock lever members.

4. The valve handle of claim 1 wherein said handle bar member includes an adjustment mechanism associated with said socket opening to ensure snug engagement of the valve stem within said socket opening.

5. The valve handle of claim 1 wherein said distal end of the lock lever member is machined to permit the lever tip to fit over the distal end of the lock lever member.

6. The valve handle of claim 1 wherein said lever tip associated with said lock lever member is of a hardened material.

7. The valve handle of claim 1 wherein said lever tip associated with said lock lever member is a removable and replaceable construction.

8. The valve handle of claim 7 wherein said lever tip construction includes an inverted U-shaped clip mounted at said distal end of said lock lever member, said clip including an inverted V-shaped projection extending from the base of said inverted U-shaped clip to be complementarily engageable with the valve lock position notches.

9. The valve handle of claim 7 wherein the valve lock position notches define teeth along a portion of the periphery of the valve lock plate and said lever tip construction includes a tongue member mounted at said distal end of said lock lever member, said tongue member flexible to index over a tooth of the valve lock plate when a sharp force is applied to the valve handle while the valve handle is engaged with the valve stem to attempt to operate the valve and to snap into position in engagement with a different valve lock position notch.

10. The valve handle of claim 1 wherein said distal end of said lock lever member extends adjacent said upper riser portion of said handle bar member to form a portion of said upper riser portion of said lock lever member and said lever tip extends from said distal end to be engageable with the valve lock position notches.

11. The valve handle of claim 1 wherein said distal end of said lock lever member terminates at or near the upper offset bend of said handle bar member and said lever tip extends from said distal end to form said upper riser portion of said lock lever member and to be engageable with the valve lock position notches.

12. The valve handle of claim 1 wherein said pivotal connection between said handle bar and lock lever members is positioned along the reaches of the steps of said members.

13. The valve handle of claim 12 wherein said handle bar member has a U-shaped cross-sectional channel along said inner side and wherein at least a portion of said channel includes strengthening structures disposed therein.

14. The valve handle of claim 13 wherein said strengthening structures include honeycomb constructions.

15. The valve handle of claim 12 wherein said lock lever member includes an outer side with a pivot nub formed thereon along the reach of said step of said lock lever member and wherein said handle bar member includes a pivot nub receptor on said inner side thereof along the reach of said step of said handle bar member to receive therein said pivot nub of said lock lever member and to be joined thereto for pivotal movement between said handle bar and lock lever members.

16. A valve handle for operating a valve having a projecting valve stem, wherein the valve is installed in a construction that has associated therewith obstructions that extend parallel to the valve stem, the valve handle comprising:
 a longitudinal handle bar having proximate and distal ends and end portions and an inner side;
 a valve stem mating portion associated with said distal end portion of said handle bar, said valve stem mating portion configured to be engageably matable to the valve stem of the valve;
 said handle bar having intermediate offset bends formed therein to define an intermediate step portion therealong, with said distal end portion of said handle bar construction forming an upper riser portion for said step portion and said proximate end portion forming a lower riser portion for said step portion;
 said offset bends distancing said proximate end portion of said handle bar construction outwardly and downwardly from said distal end portion thereof;
 said proximate end portion of said handle bar construction configured and adapted to be grippable by a user to permit such user, when said valve stem mating portion is engageably mated to the valve stem of the valve, to rotatably move said handle bar and said associated valve mounting assembly to a desired position to operate the valve;
 said offset bends sized and positioned along said handle bar construction to permit said valve handle to clear the obstructions associated with the construction in which the valve is installed when the valve handle is rotated to operate the valve;
 a longitudinal lock lever member extending adjacent to said handle bar along said inner side thereof from near said proximate end of said handle bar to a distance spaced below said valve mating portion, said lock lever member having proximate and distal ends and end portions, said lock lever member pivotally connected to said handle bar, the distal end portion having an opening extending through the lock lever member;
 a biasing mechanism disposed along the lengths of said handle bar and said lock lever member to normally bias said proximate end portion of said handle bar away from said proximate end portion of said lock lever member and said distal end portion of said handle bar towards said distal end portion of said lock lever member;
 said lock lever member having intermediate offset bends formed therein, corresponding to said offset bends along the length of said handle bar, to define an intermediate step portion in said lock lever member corresponding to said intermediate step portion along said handle bar, said corresponding offset bends of said handle bar being adjacent to said corresponding offset bends of said lock lever member, with said distal end portion of said lock lever member forming an upper riser portion for said step portion and said proximate end portion of said lock lever member forming a lower riser portion for said step portion; and
 said distal end portion of said lock lever member having a lever tip having a pair of openings for alignment with the opening in the distal end of the lock lever member and the pair of openings and the opening in the distal end of the lock lever member for receiving a bolt for connecting the lever tip to the lock lever member.

17. The valve handle of claim 16 wherein said valve stem mating portion includes an extender shaft portion mounted to said distal end portion of said handle bar to project directionally oppositely from said offset bends and sidewardly inwardly from said handle bar.

18. The valve handle of claim 17 wherein said valve stem mating portion includes a socket opening construction formed in said distal end portion of said handle bar and said extender shaft portion includes a shaft member having a first end complementarily engageable with said socket opening construction and a second end portion matably engageable to the valve stem.

19. The valve handle of claim 16 wherein the valve stem has associated therewith a valve lock plate that extends transversely to such valve stem and includes one or more valve lock position notches along a portion of the outer periphery thereof, and wherein the valve handle further includes;

said proximate end portions of said handle bar and said lock lever member configured and adapted to be grippable by a user and squeezable to overcome the biasing of said biasing mechanism to move said proximate end portions and said distal end portions, said movement of said distal end portions being sufficient to move said lever tip associated with said lock lever member away from engagement with said valve lock position notches of the valve lock plate and permitting rotation of said handle bar member and the valve stem engaged by said socket opening of said handle bar to a desired position to operate the valve;

said proximate end portions of said handle bar and said lock lever member being releasable by the user when said handle bar member and the valve stem engaged by said associated valve stem mating portion have been rotated to a desired position to operate the valve and said biasing mechanism operating upon such release to bias said proximate end portion of said handle bar away from said proximate end portion of said lock lever member and said distal end portion of said handle bar towards said distal end portion of said lock lever member to effect engagement of said lever tip associated with said lock lever member with a valve lock position notch.

20. The valve handle of claim 19 wherein said valve stem mounting portion includes a socket opening extending into said distal end portion of said handle bar from said inner side thereof, said socket opening sized to be complementarily engageable with the valve stem of the valve.

\* \* \* \* \*